United States Patent
Brown

(10) Patent No.: US 11,905,214 B2
(45) Date of Patent: Feb. 20, 2024

(54) METHODS FOR RE-USING INDUSTRIAL WASTE FOR CARBON SEQUESTRATION AND MAGNESIUM-BASED CEMENTS

(71) Applicant: ZS2 Technologies Ltd., Calgary (CA)

(72) Inventor: Douglas Geoffrey Brown, Calgary (CA)

(73) Assignee: ZS2 Technologies Ltd., Calgary (CA)

( * ) Notice: Subject to any disclaimer, the term of this patent is extended or adjusted under 35 U.S.C. 154(b) by 22 days.

(21) Appl. No.: 17/516,515

(22) Filed: Nov. 1, 2021

(65) Prior Publication Data
US 2023/0139894 A1 May 4, 2023

(51) Int. Cl.
  *C04B 14/28* (2006.01)
  *C04B 18/04* (2006.01)
  *C04B 28/10* (2006.01)
  *C04B 40/00* (2006.01)

(52) U.S. Cl.
  CPC .............. *C04B 28/10* (2013.01); *C04B 14/28* (2013.01); *C04B 18/049* (2013.01); *C04B 28/105* (2013.01); *C04B 40/0039* (2013.01)

(58) Field of Classification Search
  CPC ...... C04B 28/105; C04B 14/28; C04B 18/049; C04B 40/0231; C04B 28/10; C04B 40/0039; C04B 9/11; C04B 9/20; C04B 20/023; C04B 22/10; Y02P 40/18; Y02W 30/91
  See application file for complete search history.

(56) References Cited

U.S. PATENT DOCUMENTS

2010/0083880 A1*  4/2010  Constantz ................ C04B 7/02
                                                        106/801

FOREIGN PATENT DOCUMENTS

KR       101740697 B1 *  5/2017
WO       2012028471 A1    3/2012

OTHER PUBLICATIONS

KR-101740697-B1, machine translation (Year: 2017).*
von Hoessle, F., Farid, R., Mohamed, M. et al. The effect of different hydration media on magnesia. Discov Mater 1, 17 (2021). DOI: 10.1007/s43939-021-00017-9 (Year: 2021).*
Dung et al., "Carbonated MgO concrete with improved performance: The influence of temperature and hydration agent on hydration, carbonation and strength gain". Cement and Concrete Composites, Jun. 15, 2017 (Jun. 15, 2017), vol. 82, pp. 152-164.

* cited by examiner

*Primary Examiner* — Bryan D. Ripa
*Assistant Examiner* — Marites A Guino-O Uzzle
(74) *Attorney, Agent, or Firm* — Todd A. Rattray; Oyen Wiggs Green & Mutala LLP

(57) ABSTRACT

Magnesium-based cements (in particular, magnesium oxychloride (MOC) cement) are synthesized with a salt (magnesium chloride for MOC cement), water, and magnesium oxide. In this invention the salt is sourced from a waste brine. To the brine is added a base, for example a hydroxide or magnesium oxide. Carbon dioxide is then bubbled through the brine. Calcium carbonate precipitates out of solution. The brine is then left to cure and form cement. Optionally, calcium carbonate precipitate can be added back to (or left in) the brine prior to curing as a filler.

19 Claims, 3 Drawing Sheets

METHODS FOR RE-USING INDUSTRIAL WASTE FOR CARBON SEQUESTRATION AND MAGNESIUM-BASED CEMENTS

TECHNICAL FIELD

This invention relates to the field of cement, and in particular magnesium-based cements.

BACKGROUND

There is a general desire to reduce anthropogenic sources of carbon dioxide. Carbon dioxide is a prominent greenhouse gas that causes climate change. The global cement industry is a significant source of carbon dioxide, with the cement industry contributing an estimated 7% to anthropogenic sources of carbon dioxide and an estimated 23% by 2050.

Portland cement (the most common type of cement) is produced by first creating clinker. Portland cement is merely ground clinker with optional additives. Clinker is created by feeding raw materials to a kiln. A major constituent of the feed to the kiln is limestone ($CaCO_3$). A kiln is typically in the shape of a long cylinder. It is slanted such that the inlet side of the kiln is higher than the outlet side of the kiln, and configured to rotate to move material from its inlet to its outlet. At the outlet side of the kiln is a heat source. Because there is a heat source only on one side of the kiln, there is a temperature gradient along the length of the kiln. At a temperature of approximately 1400°-1500° C., the limestone will decompose into calcium oxide (CaO) and carbon dioxide ($CO_2$). Subsequent reactions sinter (i.e. fuse together without liquefying) the material in the kiln into clinker, which can then be ground to create Portland cement.

By mass, limestone is approximately 50% carbon dioxide, thus a significant amount of carbon dioxide is released during the formation of clinker.

Numerous strategies have been pursued to address the significant greenhouse gas (GHG) emissions from cement production. For example, during the hydration of Portland cement, calcium hydroxide ($Ca(OH)_2$) is produced. Calcium hydroxide has been identified as a possible source of carbonation (capturing carbon dioxide), therefore reversing calcination (releasing $CO_2$). Alternative strategies have been to use supplementary cementing materials (SCMs) and aggregates that have been treated with $CO_2$ to offset the emission intensity of the cement production. Further, as a technique for addressing the GHG emission from cement production, the most costly and robust process is post-combustion capture of the outlet gas of the kiln, typically using a scrubber system (e.g. amine-based scrubber system) that produces a compressed $CO_2$ gas stream that must be transported for storage.

Another category of cement is made up of magnesium-based cements. There are two main types of magnesium based cement: magnesium oxychloride (MOC) and magnesium oxysulfate (MOS). Magnesium oxychloride cements (MOC's) are an alternative to conventional Portland cement. MOC's are formed from the reaction of magnesium oxide (MgO) and magnesium chloride ($MgCl_2$). Mixing magnesium oxide, magnesium chloride, and water in a 5:1:12 ratio (i.e. 5 parts magnesium oxide to 1 part magnesium chloride to 12 parts water) and allowing it to cure creates 'phase 5 MOC', with the formula $5Mg(OH)_2 \cdot MgCl_2 \cdot 8H_2O$. Phase 5 MOC has a microscopic needle structure. The microscopic needle structure gives phase 5 MOC a high degree of structural integrity. Magnesium oxysulfate (MOS) is the sulfate analogue of MOC, wherein magnesium oxide, magnesium sulfate and water are mixed in a particular ratio to produce MOS cement. A third, less-explored magnesium carbonate based cement has been briefly investigated and abandoned due to issues around the stability of the overall cementing phase.

Magnesium oxide is a required constituent of magnesium-based cement. Currently, magnesium oxide is predominantly synthesized via a process named 'the dry process'. The dry process entails mining magnesite ($MgCO_3$), and calcining it at a temperature of 650°-950° C. Calcination of magnesite produces magnesium oxide (MgO) and carbon dioxide. A state-of-the-art dry process produces 1.1 kgCO2 per kgMgO (1.1 kgCO2 eq).

Magnesium oxide can also be synthesized via a process named 'the wet process'. The wet process entails precipitating magnesium hydroxide ($Mg(OH)_2$) from magnesium bearing waters, and heating the magnesium hydroxide at a temperature of approximately 350° C. to create magnesium oxide and water. Typically, calcium hydroxide ($Ca(OH)_2$) or sodium hydroxide (NaOH) are used to precipitate the magnesium hydroxide, which results in a relatively high cost and carbon footprint, when factoring in the energy requirements for drying the product.

Both processes for obtaining magnesium oxide, the dry process and the wet process, are highly carbon intensive.

There therefore remains a desired to reduce the carbon intensity of producing cement and to thereby ameliorate the greenhouse gas contributions of the cement industry.

There is also a general need to make use of waste streams from existing industrial processes.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method of producing cement, the method comprising: obtaining a brine, adding a base and magnesium oxide to the brine to form a mixture, bubbling a gas through the mixture wherein the gas contains carbon dioxide, precipitating calcium carbonate from the mixture, wherein the precipitating calcium carbonate results from a reaction of calcium ions in the brine and carbon dioxide from the bubbled gas, and allowing the mixture to cure to thereby form cement.

Another aspect of the invention provides a method of producing cement, the method comprising: obtaining a brine, adding a base to the brine to form a mixture, bubbling a gas through the mixture wherein the gas contains carbon dioxide, precipitating calcium carbonate from the mixture wherein the precipitating calcium carbonate results from a reaction of calcium ions in the brine and carbon dioxide from the bubbled gas, adding magnesium oxide to the mixture, and allowing the mixture to cure to thereby form cement.

Another aspect of the invention provides a method of producing cement, the method comprising: obtaining a brine, bubbling a gas through the brine wherein the gas contains carbon dioxide, precipitating calcium carbonate from the brine wherein the precipitating calcium carbonate results from a reaction of calcium ions in the brine and carbon dioxide from the bubbled gas, and allowing the mixture to cure to thereby form cement.

Another aspect of the invention provides a method of producing cement, the method comprising: obtaining a brine, bubbling a gas through the brine wherein the gas contains carbon dioxide, precipitating calcium carbonate from the brine wherein the precipitating calcium carbonate results from a reaction of calcium ions in the brine and carbon dioxide from the bubbled gas, adding magnesium oxide to the brine to form a mixture, and allowing the mixture to cure to thereby form cement.

The brine may comprise a waste stream from an industrial process. The waste stream could from at least one of the production of oil and gas, the production of potash, the production of geothermal energy and desalination. In some embodiments, the brine comprises a magnesium content of between 10,000 ppm and 120,000 ppm. In some embodiments, the brine comprises a calcium content of between 25,000 ppm to 125,000 ppm. In some embodiments, the brine comprises a sodium content of less than 150,000 ppm.

The precipitated calcium carbonate may be left in the mixture as a filler prior to allowing the mixture to cure.

The gas may comprises (or consist of) a flue gas from an industrial process and/or power generation process. In some embodiments, the flue gas comprises flue gas from the synthesis of magnesium oxide. The flue gas may have a carbon dioxide content of between 400 ppm and 150000 ppm by concentration.

The gas may comprise air.

The base could comprise any one of, or combination of the following: ammonium hydroxide, calcium hydroxide, sodium hydroxide, and potassium hydroxide.

The method may comprise dewatering the mixture prior to curing to remove dissolved ions from the mixture.

The method may comprise adding additional magnesium oxide to the mixture after precipitating calcium carbonate therefrom.

Bubbling the gas through the mixture may comprise bubbling microbubbles of the gas through the mixture or bubbling nanobubbles of the gas through the mixture In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
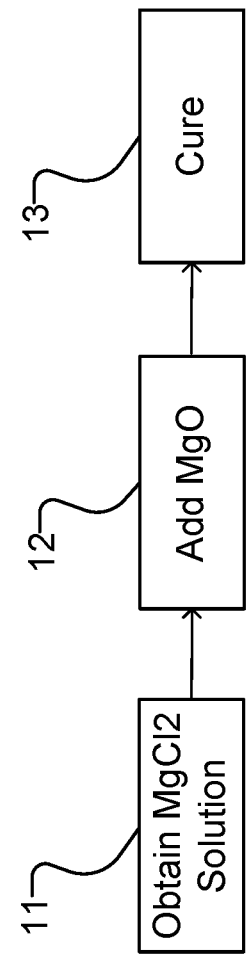
FIG. 1 is a flowchart depicting a method of forming magnesium-based cement according to the prior art.

FIG. 1 is a flowchart showing a method of forming magnesium-based cement (specifically, MOC) according to prior art techniques. Step 11 comprises acquiring a concentrated solution containing magnesium chloride. Magnesium chloride is an ingredient involved in the creation of MOC cement. Water is also an ingredient for MOC cement, hence the aqueous solution of magnesium chloride. Step 12 comprises adding magnesium oxide to the magnesium chloride solution. Given the expense associated with acquiring magnesium oxide, it is preferably added in a stoichiometric ratio to the magnesium chloride and water to limit the amount of unreacted magnesium oxide. As mentioned above, for a phase 5 MOC (which is the phase of MOC cement with a high level of structural integrity), the stoichiometric ratio is 5 parts magnesium oxide to 1 part magnesium chloride to 12 parts water. The mixture from step 12 is then allowed to cure per step 13. The mixture will initially have a slurry-like consistency, but upon curing it will solidify. Curing can take up to 7 days, though the curing time is variable and is a function of at least (but not limited to): temperature, humidity, and shape of the cured mixture (for example, curing the mixture in a cube shaped container will result in a faster curing time than curing the mixture in a spherical container due to a cube's higher surface area to volume ratio).

There are at least two disadvantages associated with the prior art method of forming cement shown in FIG. 1. The first disadvantage is associated with obtaining a magnesium chloride solution. Ideally, the magnesium chloride solution obtained in step 11 should have as high a purity of magnesium chloride as possible. Impurities (such as calcium ions) reduce the effectiveness of the curing step 13, as it will limit the extent of reaction between magnesium oxide, magnesium chloride, and water. The calcium in solution does not form a 5 MOC structure and inhibits the growth of structurally strong cements. The second disadvantage of the FIG. 1 cement formation technique is associated with the carbon intensity of forming magnesium oxide. As mentioned above, production of magnesium oxide is a highly carbon dioxide intensive process, and the FIG. 1 method does not ameliorate the carbon intensity of producing cement.

Though the flowchart in FIG. 1 shows the procedure for making magnesium oxychloride cement (MOC), an analogous procedure can be followed for making other types of magnesium-based cement. For example, if the ion in solution was magnesium sulfate rather than magnesium chloride, then magnesium oxysulfate (MOS) would form. As mentioned above, magnesium oxysulfate (MOS) is another type of magnesium-based cement.

Figure 2:
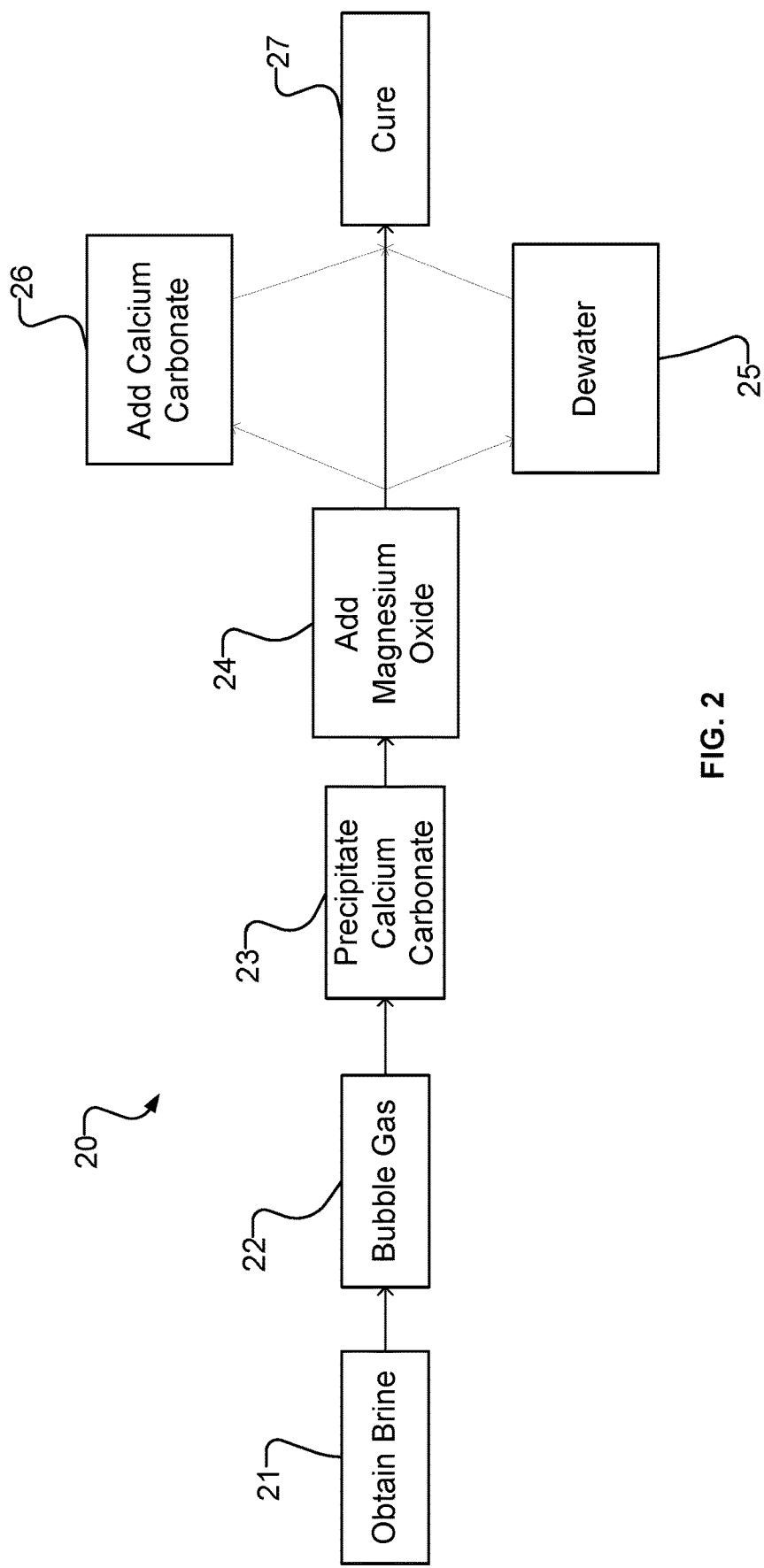
FIG. 2 is a flowchart depicting a method of forming magnesium-based cement according to an example embodiment of this invention.

FIG. 2 depicts a method 20 of forming cement according to an example embodiment of the invention. Step 21 comprises obtaining a brine. The brine is preferably sourced from an industrial process. Ideally the brine is a waste stream from the production of oil and gas, potash, desalination, geothermal energy and/or the like. Oil and gas, potash, desalination and geothermal energy production all produce brines with high magnesium concentrations (in excess of 10,000 ppm), and high calcium concentrations (in excess of 50,000 ppm). These waste streams typically contain high amounts of magnesium and calcium.

The magnesium content of the waste stream that makes up the step 21 brine may be in a range between 10,000 ppm and 120,000 ppm and, in some embodiments, between 50,000 ppm-75,000 ppm. The calcium content of the waste stream that makes up the brine may be in a range between 25,000 ppm to 125,000 ppm and, in some embodiments, between 25,000 ppm to 50,000 ppm. In some embodiments, the sodium content of the waste stream that makes up the brine may be less than 150,000 ppm and, in some embodiments, less than 10,000 ppm. There may be some sulfate ions in the waste stream. If this is the case (i.e. sulphate ions are present), then during the curing step (step 27), some magnesium oxysulfate will form.

Step 22 comprises bubbling a gas through the brine. The gas could be from a number of sources, but the step 22 gas preferably contains carbon dioxide. For example, the gas could be flue gas, compressed air and/or an emission source from an industrial process. Beyond the desirability that there be carbon dioxide, the step 22 gas could have any composition and have a wide array of process stream characteristics. For example, the step 22 gas could have high particulate contents, and it could also be at high pressure or temperature. The step 22 gas can contain moisture, O2, NOx, SOx and particulate matter that may either remain entrapped in the final concrete mixture or be passed through the reaction mixture.

The step 22 gas could also be flue gas from the production of magnesium oxide. As mentioned above, the production of magnesium oxide releases substantial amounts of carbon dioxide. Using flue gas from the production of magnesium oxide would be particularly advantageous, as the carbon dioxide created during the production of magnesium oxide (see step 24 described in more detail below) could be captured during the FIG. 2 cement formation method 20.

Bubbling through the gas containing carbon dioxide per step 22 causes precipitation of calcium carbonate per step 23. When in basic solution, calcium ions exposed to carbon dioxide from the bubbling of CO2-containing gas in step 22 will precipitate out of solution in step 23 and form solid calcium carbonate. Other carbonates may also form when the brine is exposed to carbon dioxide in step 22 (magnesium carbonate may precipitate in step 23, for example), however the predominant carbonate that forms as a precipitate in step 23 will be calcium carbonate. The approach is based on the solubility product differences in the Ca(OH)2 or Mg(OH)2 which dissociate to Ca2+/Mg2+ and OH— and the availability of the corresponding ions, that then react with $CO_3^{2-}$ to be precipitated as carbonates. In addition, the higher hydration energy of Mg2+ (compared to Ca2+), drives Ca-carbonate precipitation preferentially under the coexistence of Ca and Mg ions as described, for example, by Bang et al. in *Journal of $CO_2$ Utilization* 33 (2019) 427-433.

The precipitated calcium carbonate can either remain passively in the solution and the final concrete mix as a precipitate or be removed through a filtering operation (which would remove the solid calcium carbonate).

In currently preferred techniques, the gas used to bubble through the solution in step 22 comprises microbubbles (on the order of 1 μm-1000 μm in diameter) or nanobubbles (on the order of 100 nm-1000 nm in diameter), which may be generated using a suitable microbubble or nanobubble generator. Microbubble and nanobubble generators create very small bubbles of a gas in a liquid. Microbubbles and nanobubbles of relatively small size may be advantageous as their small size increases the surface area per unit volume of each of the bubbles of gas. This relatively large surface area to volume ratio in turn increases the extent of carbonation of the ions in the brine, thereby increasing the amount of calcium carbonate precipitated out of the brine.

Bubbling the gas containing carbon dioxide through the brine is advantageous for at least two reasons. A first advantage is that bubbling through the gas sequesters carbon dioxide in the form of calcium and/or magnesium carbonate, which has a low solubility in water. A second advantage is that once solid calcium carbonate is formed, it can be added back to (or left in) the mixture prior to or during the curing step (step 27—explained in more detail below) as a filler for the magnesium-based concrete.

After precipitating calcium carbonate, step 24 comprises adding magnesium oxide to the mixture. Magnesium oxide is a component of magnesium-based cement.

Step 25 is an optional step that comprises dewatering the mixture. Dewatering may server a number of purposes.

One purpose of the optional step 25 dewatering process may be to remove dissolved ions. As mentioned before, the brine may contain ions such as (but not limited to) sodium, potassium, or iron. These ions do not normally form part of the binding phase of magnesium-based cements. Furthermore, these ions will not precipitate out of solution to the same extent as calcium carbonate (e.g. due to the low solubility of calcium carbonate). As such, it may be desirable to remove some of the water from the mixture prior to curing in step 27. Removing some of the water may reduce the total amount of dissolved ions in the curing step, but the concentration of dissolved ions in solution will remain the same.

Another purpose for optional step 25 dewatering process may be to adjust the ratio of magnesium oxide, magnesium chloride, and water. As mentioned before, the constituents of MOC cement are ideally mixed in a ratio of 5 parts magnesium oxide to 1 part magnesium chloride to 12 parts water, as this will form a phase of MOC cement that has high strength. Too much water may cause less desirable MOC cement phases to form. These are non-exhaustive purposes for dewatering in optional step 25; there may be other purposes for the optional dewatering step 25.

Step 26 is another optional step that comprises adding solid calcium carbonate precipitated in step 23 back to the mixture. After adding magnesium oxide (per step 24), the mixture may have a relatively high pH. Calcium carbonate is moderately insoluble at neutral pH's (of approximately 7), but calcium carbonate's solubility decreases as a function of increasing pH. As such, adding calcium carbonate back to the solution in optional step 26 after adding magnesium oxide in step 25 will not cause calcium ions to form in the solution. Instead, the solid calcium carbonate will form part of the cured cement/concrete, and may act as a 'filler' in the cement/concrete. This use of calcium carbonate as part of the cured cement/concrete may be advantageous in that it increases the total amount of carbon storage capacity of the product obtained from the process, while having a positive impact on the binding strength of the cement/concrete.

Step 27 comprises curing the solution. The time spent curing is a function of at least temperature, humidity, and the shape of the curing vessel. In some implementations, curing in step 27 may take time in a range of 72 hours to 7 days. In some implementations, curing in step 27 is performed at a temperature in a range of 20°-50° C., with currently preferred temperatures in a range of 20°-30° C. During the step 27 curing process, humidity may be maintained relatively high (e.g. above 90%) for a first period of time (e.g. 18-30 hours) and the humidity may be decreased (e.g. to levels in a range of 50%-80% or to levels of 50%-60%) from 30 hours onward for the remainder of the step 27 curing process.

Figure 3:
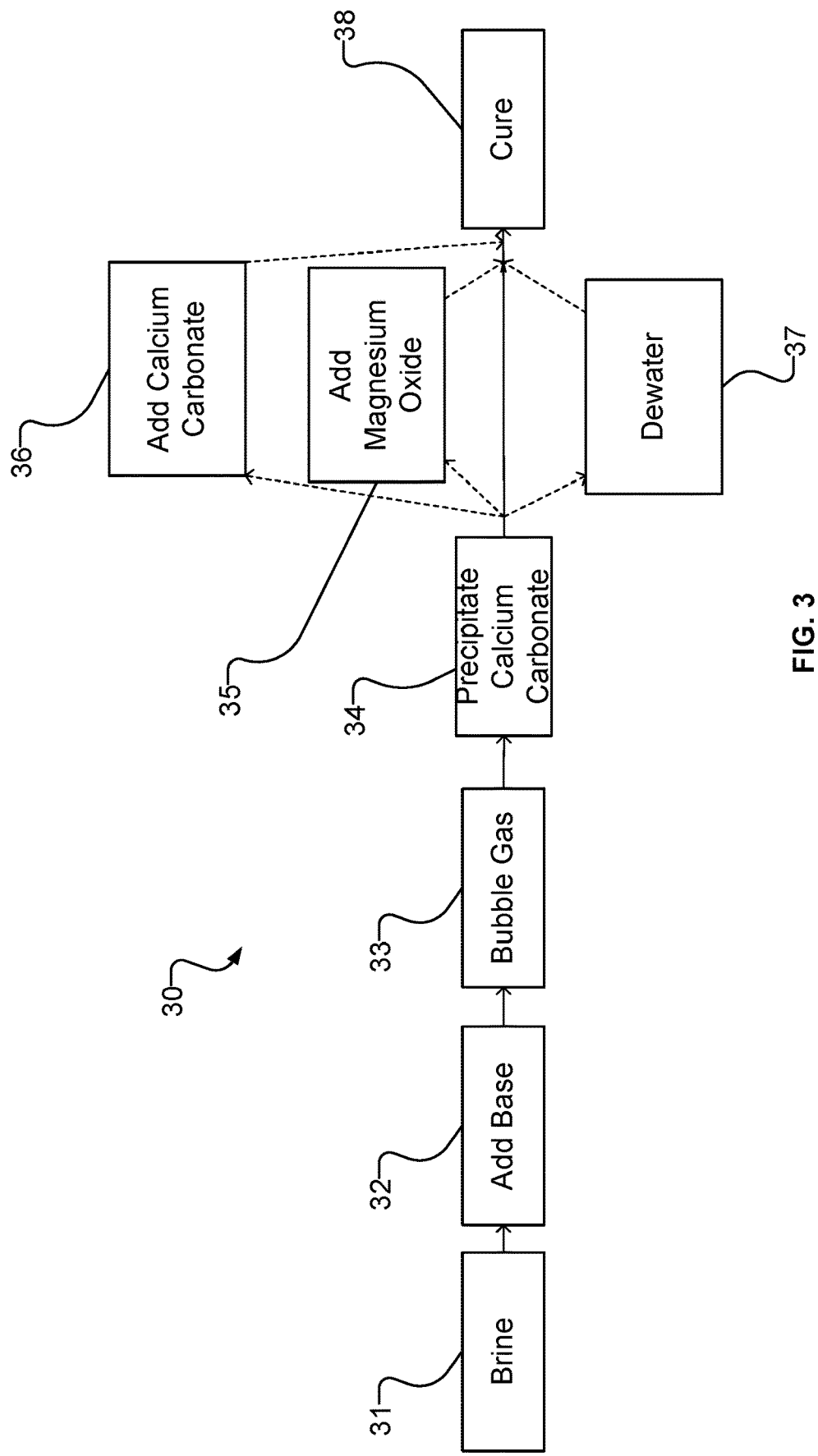
FIG. 3 is a flowchart depicting a method of forming a magnesium-based cement according to an example embodiment of this invention.

FIG. 3 depicts a method 30 for forming cement according to another example embodiment. Method 30 of FIG. 3 is similar in many respects to method 20 in FIG. 2, except that method 30 involves the extra step of adding base to the solution prior to bubbling gas through the brine. As mentioned above, the solubility of calcium carbonate decreases with increasing pH. Consequently, adding base to the solution (increasing the pH) prior to bubbling $CO_2$-containing gas through the solution may result in increasing the amount of calcium ions extracted from the solution (in the form of precipitated calcium carbonate) by bubbling $CO_2$-containing gas through the solution.

Step 31 comprises obtaining a brine. Step 31 may be substantially similar to step 21 of method 20 (FIG. 2) described above. As mentioned above, the brine could be sourced from an industrial process. Ideally the brine is a waste stream from the production of oil and gas, potash, desalination, geothermal energy and/or the like. There may be some sulfate ions in the waste stream. If this is the case, then during the curing step (step 38), some magnesium oxysulfate will form.

Step 32 comprises adding a base to the brine. The base could be any suitable compound, or combination of compounds, that increases the pH of the brine, including, for example, the following compounds. Such base additives may include, by way of non-limiting example, hydroxides (such as sodium hydroxide, calcium hydroxide, or ammonium hydroxide), natural alkaline mineral sources such as treated zeolite, and/or the like. Ammonium hydroxide is particularly advantageous to use in the example embodiment of method 30 shown in FIG. 3, because ammonium hydroxide will form ammonium chloride when in solution. Ammonium chloride is soluble, and will remain in the brine liquid until the optional dewatering in step 36. In step 36 (discussed in more detail below), the brine can be dewatered to remove excess liquid prior to curing. Since the ammonium chloride is soluble, it will be removed in the dewatering step. The ammonium chloride in solution from the dewatering step can then be easily converted back into ammonium hydroxide (e.g. through the Solvay Process).

Instead of adding a hydroxide, magnesium oxide itself could be added to the brine. Magnesium oxide is advantageous to add because it is desirable as part of the binding phase for the concrete. It would be disadvantageous to add magnesium oxide in that is far in excess of the stoichiometric ratio associated with phase 5 MOC (discussed above), as magnesium oxide is both expensive and carbon intensive to produce and, further, excessive magnesium oxide may promote the formation of less desirable cement phases if not fully consumed as a base.

Furthermore, magnesium oxide in combination with another base could be added to the brine to increase the pH of the brine.

Adding a base to the brine in step 32 is advantageous for at least the following reason. Calcium carbonate's solubility decreases as a function of increasing pH. Increasing the pH with a base will decrease the concentration of calcium ions in remaining in solution after steps 33 and 34 (i.e. increasing the pH of the solution will increase the amount of calcium carbonate precipitate caused by bubbling $CO_2$-containing gas through the solution).

Step 33 is similar to step 22 of method 20 (FIG. 2) described above and comprises bubbling a gas through the mixture. As mentioned before, calcium ions in the mixture, when exposed to gaseous carbon dioxide, will precipitate out of solution. Given the high pH (because of step 32), there will be increased precipitation of calcium carbonate from solution due to calcium carbonate's low solubility at high pH. As mentioned in the description of method 20 (FIG. 2), the bubbling should ideally be done using microbubbles and/or nanobubbles which may be produced with a microbubble or nanobubble generator, as small size bubbles tend to increase the extent of carbonation of ions (including, in particular, carbonation of calcium ions with carbon dioxide to form calcium carbonate precipitate) in the brine.

Step 34 comprises precipitation of the calcium carbonate from the brine through the reaction between calcium ions in the brine and carbon dioxide in the gas. Step 34 may be similar to step 23 of method 20 (FIG. 2) described above.

Step 35 is an optional step that comprises adding magnesium oxide to the mixture. Magnesium oxide is a component which helps to create the binding phase of MOC cement. If magnesium oxide was not added as the base in step 32, or if there is insufficient magnesium oxide to achieve the stoichiometric ratio desirable for phase 5 MOC, then step 35 may be used to add additional magnesium oxide (preferably in an amount that achieves a stoichiometric ratio of 5 parts magnesium oxide to 1 part magnesium chloride to 12 parts water) to the mixture.

Step 36 is an optional step that comprises adding back solid calcium carbonate to the mixture. Optional step 36 may be similar to option step 26 in method 20 (FIG. 2). As described above, calcium carbonate has low solubility at high pH. In some embodiments, some or all of the calcium carbonate optionally added back to the mixture in optional step 36 may be the precipitate obtained from step 34. The calcium carbonate added in block 36 may act as a filler in the final cement product.

Step 37 is an optional step that comprises dewatering the mixture. Optional dewatering in step 37 may be similar to optional dewatering in option step 25 of method 20 (FIG. 2). As discussed above, dewatering may serve a number of purposes, which include, without limitation: (1) to remove unwanted soluble ions from solution, and (2) to adjust the ratio of magnesium oxide, magnesium chloride, and water. Furthermore, in embodiments of this invention where the base in step 32 is ammonium hydroxide, dewatering will remove ammonium chloride from solution, so that it can subsequently be regenerated to ammonium hydroxide (e.g. through the Solvay Process).

Step 38 comprises curing the mixture so that it can form cement. The curing in step 38 may be substantially similar to the curing described above in connection with step 27 of method 20 (FIG. 2). During the step 38 curing, magnesium oxychloride (MOC) will form, and trace amounts of magnesium oxysulfate (MOS) will also form (depending on the amount of sulfates in the brine).

The following examples are intended to illustrate the present invention and to teach one of ordinary skill in the art how to use the formulations of the invention. They are not intended to be limiting in any way, unless features of these examples are recited in the claims.

EXAMPLES

Example 1—Naturally-Sourced Brine with Magnesium Oxide Added, with Gas then Bubbled Through the Mixture To a reaction chamber (in this example, a 3-neck flask) was added a brine from southern Alberta (3 L; Mg 35,000 ppm; Ca 50,000 ppm) and under mechanical stirring powdered MgO (1.60 kg; 40.2 mol) was added while monitoring the pH (which reaches approximately 10.5 after the addition of MgO). To the chamber was bubbled at a flow rate of 0.5 L/min through a microbubble generator column an 11% CO2 89% air mixture of gas that was positioned vertically in the chamber. When the pH reached neutralization, the bubbling was stopped and the slurry was poured into a mould and sealed for 24 hours in a 30° C. environment. After 24 hours the sample was demoulded and allowed to cure further in ambient condition of 20° C. and 50% humidity for a period of 7 days. The structural performance was then evaluated through compressive strength testing of 2 inch diameter and 6 inch length cylinders in a universal testing machine (which tests the compressive strength of materials). Samples exhibited over 65 MPa compressive strength. Extent of carbonation was evaluated by thermogravimetric analysis (TGA) and powder x-ray diffraction (PXRD) analysis and exhibited ~8-10% carbonation.

Example 2—Synthetic Brine Containing No Calcium Ions with Magnesium Oxide Added, with Gas then Bubbled Through the Mixture To a reaction chamber (in this example, a 3-neck flask) was added MgCl2.6H2O (2.70 kg; 13.3 mol) and under mechanical stirring powdered MgO (1.60 kg; 40.2 mol) was added. To the chamber was bubbled at a flow rate of 0.5 L/min through a microbubble generator column an air stream of gas that was positioned vertically in the chamber with 400 ppm CO2. When the pH reached neutralization, the bubbling was stopped and the slurry was poured into a mould and sealed for 24 hours in a 30° C. environment. After 24 hours the sample was demoulded and allowed to cure further in ambient condition of 20° C. and 50% humidity for a period of 7 days. The structural performance was then evaluated through compressive strength testing of 2 inch diameter and 6 inch length cylinders in a UTM testing machine. Samples exhibited over 45 MPa compressive strength. Extent of carbonation was evaluated by TGA and PXRD analysis to be less than 1%.

Example 3—Synthetic Brine Containing No Calcium Ions with Magnesium Oxide and Ammonium Hydroxide Added To a reaction chamber (in this example, a 3-neck flask) was added MgCl2.6H2O (2.70 kg; 13.3 mol) dissolved in water (1.8 L) and under mechanical stirring powdered MgO (1.60 kg; 40.2 mol) was added. Ammonium hydroxide was added. To the chamber was bubbled at a flow rate of 0.25 L/min through a microbubble generator column a stream of gas (11% CO2 and 89% air mixture) that was positioned vertically in the chamber. When the pH reached neutralization, the bubbling was stopped and the slurry was filtered to remove approximately 10% of the volume (soluble NH4Cl) of the solution and was poured into a mould and sealed for 24 hours in a 30° C. environment. After 24 hours, the sample was demoulded and allowed to cure further in ambient condition of 20° C. and 50% humidity for a period of 7 days. The structural performance was then evaluated through compressive strength testing of 2 inch diameter and 6 inch length cylinders in a UTM testing machine. Samples exhibited over 55 MPa compressive strength. Extent of carbonation was evaluated by TGA and PXRD analysis and demonstrated approximately 7% and 8% respectively carbonates.

Example 4—Synthetic Brine Containing Calcium and Magnesium Ions with Magnesium Oxide and Ammonium Hydroxide Added To a reaction chamber (in this example, a 3-neck flask) was added a mixture of CaCl2 (6.5 mol) and MgCl2.6H2O (6.5 mol) dissolved in water (1.8 L) and under mechanical stirring powdered MgO (1.60 kg; 40.2 mol) was added. Ammonium hydroxide was added and to the chamber was bubbled at a flow rate of 0.25 L/min through a microbubble generator column an 11% CO2 89% air mixture of gas that was positioned vertically in the chamber. When the pH reached neutralization, the bubbling was stopped and the slurry was filtered to remove approximately 10% of the volume (soluble NH4Cl) of the solution and poured into a mould and sealed for 24 h in a 30° C. environment. After 24 h the sample was demoulded and allowed to cure further in ambient condition of 20° C. and 50% humidity for a period of 7 days. The structural performance was then evaluated through compressive strength testing of 2 inch diameter and 6 inch length cylinders in a UTM testing machine. Samples exhibited over 48 MPa compressive strength at day 7. Extent of carbonation was evaluated by TGA and PXRD analysis.

Example 5—Microbubbles of Air

To a reaction chamber (in this example, 3-neck flask) was added a mixture of CaCl2 (6.5 mol) and MgCl2.6H2O (6.5 mol) dissolved in water (1.8 L) and under mechanical stirring powdered MgO (1.60 kg; 40.2 mol) was added. Ammonium hydroxide was added. To the chamber was bubbled air at a flow rate of 0.25 L/min through a microbubble generator column that was positioned vertically in the chamber. When the pH reached neutralization, the bubbling was stopped and the slurry was filtered to remove approximately 10% of the volume (soluble NH4Cl) of the solution and poured into a mould and sealed for 24 h in a 30° C. environment. After 24 h the sample was demoulded and allowed to cure further in ambient condition of 20° C. and 50% humidity for a period of 7 days. The structural performance was then evaluated through compressive strength testing of 2 inch diameter and 6 inch length cylinders in a UTM testing machine. Samples exhibited over 33 Mpa compressive strength at day 7.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A method of producing magnesium-based cement, the method comprising:
   obtaining a brine;
   bubbling a gas through the brine wherein the gas contains carbon dioxide;
   precipitating calcium carbonate from the brine, wherein the precipitating calcium carbonate results from a reaction of calcium ions in the brine and carbon dioxide from the bubbled gas;
   adding magnesium oxide to the brine to form a mixture; and
   allowing the mixture to cure and to thereby form magnesium-based cement.

2. The method of claim 1 wherein obtaining the brine comprises obtaining the brine from a waste stream of an industrial process.

3. The method of claim 1 wherein the brine comprises a waste stream from at least one of: production of oil and gas, production of potash, production of geothermal energy, and desalination.

4. The method of claim 1 wherein the brine comprises a magnesium content of between 10,000 ppm and 120,000 ppm.

5. The method of claim 1 wherein the brine comprises a calcium content of between 25,000 ppm to 125,000 ppm.

6. The method of claim 1 wherein the brine comprises a sodium content of less than 150,000 ppm.

7. The method of claim 1 comprising leaving the precipitated calcium carbonate in the mixture as a filler prior to allowing the mixture to cure.

8. The method of claim 1 wherein the gas comprises flue gas from an industrial process and/or power generation process.

9. The method of claim 8 wherein the flue gas has a carbon dioxide content of between 400 ppm and 150,000 ppm by concentration.

10. The method of claim 1 wherein the gas comprises flue gas from the synthesis of magnesium oxide.

11. The method of claim 1 wherein the gas comprises air.

12. The method of claim 1 comprising dewatering the mixture prior to curing to remove dissolved ions from the mixture.

13. The method of claim 1 wherein adding magnesium oxide to the brine occurs before bubbling the gas through the brine, to thereby increase the pH of the brine.

14. The method of claim 1 wherein adding magnesium oxide to the brine occurs after bubbling the gas through the brine.

15. The method of claim 1 wherein magnesium oxide to the brine occurs before and after bubbling the gas through the brine.

16. The method of claim 1 further comprising adding a base to the brine prior to bubbling gas through the brine to thereby increase the pH of the brine.

17. The method of claim 1 wherein bubbling a gas through the mixture comprises bubbling microbubbles of the gas through the mixture or bubbling nanobubbles of the gas through the mixture.

18. A method of producing magnesium-based cement, the method comprising:
   obtaining a brine;
   adding a base and magnesium oxide to the brine to form a mixture;

bubbling a gas through the mixture wherein the gas contains carbon dioxide;

precipitating calcium carbonate from the mixture, wherein the precipitating calcium carbonate results from a reaction of calcium ions in the brine and carbon dioxide from the bubbled gas; and allowing the mixture to cure and to thereby form magnesium-based cement.

19. A method of producing magnesium-based cement, the method comprising:

obtaining a brine;

adding a base to the brine to form a mixture;

bubbling a gas through the mixture wherein the gas contains carbon dioxide, wherein the precipitating calcium carbonate results from a reaction of calcium ions in the brine and carbon dioxide from the bubbled gas;

adding magnesium oxide to the mixture; and allowing the mixture to cure and to thereby form magnesium-based cement.

* * * * *